United States Patent

[11] 3,576,561

[72] Inventor Gabriel Henri Leon Dureau
Le Perreux Sur Marne, France

[21] Appl. No. 610,879
[22] Filed Jan. 23, 1967
[45] Patented Apr. 27, 1971
[73] Assignee Societe Alsacienne de Constructions Atomiques de Telecommunications et d'Electronique Alcate
Mulhouse, Haut Rhin, France
[32] Priority Aug. 1, 1961
[33] France
[31] 869,759
Continuation-in-part of application Ser. No. 212,355, July 25, 1962, now abandoned.

[54] DIGITAL-ANALOGUE CONVERTERS
7 Claims, 10 Drawing Figs.

[52] U.S. Cl. 340/347
[51] Int. Cl. H03k 13/04
[50] Field of Search 340/347 (AD), (D-A), 347

[56] References Cited

UNITED STATES PATENTS 3,015,815 1/1962 Mann 340/347

*Primary Examiner*—Maynard R. Wilbur
*Assistant Examiner*—Charles D. Miller
*Attorney*—Smythe and Moore

ABSTRACT: A converter of the digital-analogue-type for producing analogue voltages having a predetermined nonlinear characteristic in which digital switches operated in binary coded format provide signals for selectively connecting different ones of a plurality of weighted resistances to a reference voltage source in response to signals from the several digital switches and to signals from the outputs of logic AND elements each having an input connected to a digital switch of a given rank and an input connected to a digital switch of higher rank, there being one resistance for each digital switch and one for each logic AND circuit. The output ends of the weighted resistances are connected to a common output terminal to provide output voltages of a predetermined nonlinear characteristic which may be utilized as such or connected to a comparator for feeding signals back to the digital switches for translating nonlinear voltages to be measured into a digital indication. In one embodiment, the number of logic AND elements associated with each digital switch corresponds to the number of digital switches of a higher rank whereby a logic AND element of each switch except that of highest rank is connected to each of the switches of higher rank.

| DECIMAL NUMBERS | BINARY DIGITS e | d | c | b | a | VOLTAGE AT POINT A | FIRST DEGREE DIFFERENCE |
|---|---|---|---|---|---|---|---|
| 0 | 0 | 0 | 0 | 0 | 0 | 0.00 | |
| 1 | 0 | 0 | 0 | 0 | — | 0.02 | 0.02 |
| 2 | 0 | 0 | 0 | — | 0 | 0.06 | 0.04 |
| 3 | 0 | 0 | 0 | — | — | 0.12 | 0.06 |
| 4 | 0 | 0 | — | 0 | 0 | 0.20 | 0.08 |
| 5 | 0 | 0 | — | 0 | — | 0.30 | 0.10 |
| 6 | 0 | 0 | — | — | 0 | 0.42 | 0.12 |
| 7 | 0 | 0 | — | — | — | 0.56 | 0.14 |
| 8 | 0 | — | 0 | 0 | 0 | 0.72 | 0.16 |
| 9 | 0 | — | 0 | 0 | — | 0.90 | 0.18 |
| 10 | 0 | — | 0 | — | 0 | 1.10 | 0.20 |
| 11 | 0 | — | 0 | — | — | 1.32 | 0.22 |
| 12 | 0 | — | — | 0 | 0 | 1.56 | 0.24 |
| 13 | 0 | — | — | 0 | — | 1.82 | 0.26 |
| 14 | 0 | — | — | — | 0 | 2.10 | 0.28 |
| 15 | 0 | — | — | — | — | 2.40 | 0.30 |
| 16 | — | 0 | 0 | 0 | 0 | 2.72 | 0.32 |
| 17 | — | 0 | 0 | 0 | — | 3.06 | 0.34 |
| 18 | — | 0 | 0 | — | 0 | 3.42 | 0.36 |
| 19 | — | 0 | 0 | — | — | 3.80 | 0.38 |
| 20 | — | 0 | — | 0 | 0 | 4.20 | 0.40 |
| 21 | — | 0 | — | 0 | — | 4.62 | 0.42 |
| 22 | — | 0 | — | — | 0 | 5.06 | 0.44 |
| 23 | — | 0 | — | — | — | 5.52 | 0.46 |
| 24 | — | — | 0 | 0 | 0 | 6.00 | 0.48 |
| 25 | — | — | 0 | 0 | — | 6.50 | 0.50 |
| 26 | — | — | 0 | — | 0 | 7.02 | 0.52 |
| 27 | — | — | 0 | — | — | 7.56 | 0.54 |
| 28 | — | — | — | 0 | 0 | 8.12 | 0.56 |
| 29 | — | — | — | 0 | — | 8.70 | 0.58 |
| 30 | — | — | — | — | 0 | 9.30 | 0.60 |
| 31 | — | — | — | — | — | 9.92 | 0.62 |
FIG. 5
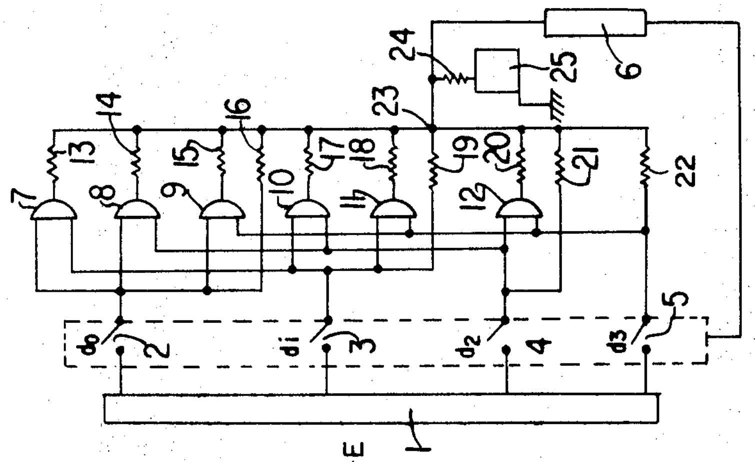
FIG. 2
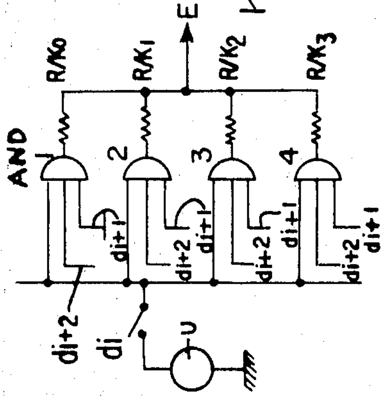
FIG. 1
INVENTOR
GABRIEL HENRI LEON DUREAU
BY
Smythe & Moore
ATTORNEYS INVENTOR
GABRIEL HENRI LEON DUREAU
BY Smythe & Moore
ATTORNEYS INVENTOR
GABRIEL HENRI LEON DUREAU
BY Smythe & Moore
ATTORNEYS INVENTOR
GABRIEL HENRI LEON DUREAU
BY Smythe & Moore
ATTORNEYS

DIGITAL-ANALOGUE CONVERTERS

This invention relates to digital-analogue and/or analogue-digital converters and to their applications, particularly to the generation of functions and to pickup or sensing devices for measuring physical values as represented by the output voltages of the pickup or sensor, as well as to pulse-code modulated telecommunication systems. The invention also relates to apparatus comprising such digital-analogue and/or analogue-digital converters, and is a continuation-in-part of copending application Ser. No. 212,355, filed July 25, 1962, now abandoned.

The decoding apparatus of the invention belongs, in a general way, to the kinds used in the beginning in the pulse-code modulated telecommunication systems, in which the purpose of the decoder is to change the groups of code pulses into a variable amplitude signal substantially proportional to the original amplitude of the signal constituting the intelligence to be conveyed. Whatever their application, the purpose of such apparatus is to change a series of successive binary numbers represented in the customary electrical form (as a voltage in the respective circuit of each digit) into a series of voltages that can be picked off at the output terminals.

To the extent that they have been improved, such apparatus has found numerous other applications, notably in systems for processing intelligence and more particularly in analogue-digital converters, apparatus that converts voltages supplied, for example, by thermocouples, flow and pressure pickups, and similar devices, into numerical values.

There are presently known linear digital-analogue converters, that is, apparatus which, on having applied to its input the successively larger numbers of the binary numeration, produce, at its output, a voltage that increases by steps of equal amplitude, or, in other words, a linear average increase. To this end, such known apparatus is provided with a resistance network, such that for each binary number there corresponds, according to its rank, a resistance and a single resistance, popularly called the "balancing resistance." The values of these resistances fall as the powers of 2, as one goes from the digits of unit's place toward digits of higher powers.

Contrary to such known apparatus, the digital-analogue converters of the invention are such that a temporal succession of binary numbers applied at the input produces a voltage that no longer increases in constant step, but follows a nonlinear law. For the sake of simplicity, the apparatus of the invention will be called a nonlinear digital-analogue converter.

The nonlinear digital-analogue converter of the invention essentially comprises a network of weighted resistances comprised, for each binary digit, of a plurality of resistances, each of which may be selectively connected to the output of a reference voltage that can be switched.

The reference voltage can be switched by a control voltage coming from a logic element AND, OR, or EXCLUSIVE OR, the inputs of which element are fed, on the one hand, a voltage representative of the digit of the rank considered and, on the other hand, voltages representing digits of higher rank or their complement.

To measure a physical value represented by a voltage at the output of the apparatus, the source to be measured and a comparator, actuating the gating switches of the generator, are connected to a common point of the weighted resistances.

In order to produce a function, a low value resistance is connected to this common point so as to obtain, at this junction, a voltage that varies in accordance with any desired law.

The invention, accordingly, has two principal aspects. First, the conversion of binary coded input signals into a series of nonlinear output or analogue voltages following a predetermined mathematical curve or the like (such as a parabola) for any desired functional use such as in a computer. Secondly, to produce a comparison voltage having the same nonlinear characteristics as a voltage to be measured or compared (such as the outputs from thermocouples, flow and pressure sensors, and the like) and to translate such measured or compared voltage into digital format.

An object of the invention, therefore, is to provide a new and improved converter of the digital-analogue type in which signals in binary format are converted to an analogue format having a predetermined characteristic.

A further object of the invention is the provision of a converter of such type in which the output signal is representative of a signal of a particular rank and all higher ranks of the binary code involved.

Another object of the invention is the provision of a digital-analogue converter in which digitally operated logic elements switch one or more weighted resistors connected therewith to provide a nonlinear output voltage corresponding to the rank of a binary coded signal and signals of all higher ranks.

A further object of the invention is the provision of a comparative type of converter in which nonlinear analogue voltages having predetermined characteristics are matched with voltages of like characteristics.

Still another object of the invention is the provision of a new and improved digital-analogue-digital converter of the comparative type which utilizes signals of one rank and those of a higher rank to produce a nonlinear output signal corresponding to a signal to be measured and designates in digital format the measured signal.

The foregoing and other objects, advantages and features of the invention will be apparent from the following description taken in conjunction with the attached drawings which exemplify certain embodiments of the invention.

In the drawings:

FIG. 1 is a schematic diagram illustrating the general principles of the invention;

FIG. 2 illustrates the digital-analogue-digital aspect of the invention;

FIG. 5 is a table illustrating the various functions of the converter shown in FIG. 4;

Figure 7:
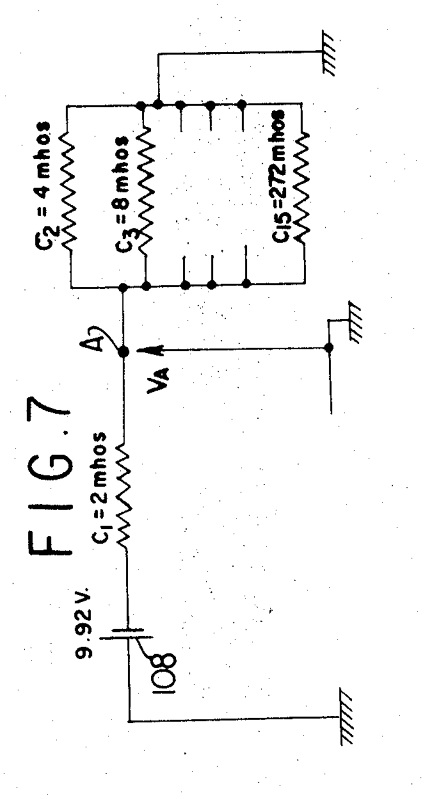
FIG. 7 is an equivalent diagram representing the application of one demonstrative digital number.

Since the OR and EXCLUSIVE OR operations carrying out different combinations of binary digits are reducible to AND operations working on these same digits and their complements, the algebra of binary circuits teaches that it can be said that, in its most general form, the balancing factor Pi belonging to a digit of rank *i* is a linear function of the "maxterms" (see "Logical Design of Digital Computers" by Montgomery PHISTER: J. Wiley and Sons) of the binary digits of higher rank:

$$Pi = \sum_{l=0}^{l=2^{n-i}} KlMl \qquad (1)$$

where *n* is the number of binary digits in the number considered, M is the maxterms of the digits of higher rank and the coefficients K are numerical constants. For a digit of rank *i* and preceded by two digits of higher rank, expression (1) becomes:

$$Pi = K_0(\alpha_i+1\alpha_i+2) + K_1(\alpha_i+1\bar{\alpha}_i+2) + K_2(\bar{\alpha}_i+1\alpha_i+2) + K_3(\bar{\alpha}_i+1\bar{\alpha}_i+2) \qquad (2)$$

In FIG. 1, $K_0$, $K_1$, $K_2$, and $K_3$ are constants inversely proportional to the values of the balancing resistances. Four circuits $AND_1$, $AND_2$, $AND_3$, and $AND_4$, each having three inputs, represent the four maxterms. Each input respectively corresponds to $\alpha_i$, $\alpha_{i+1}$, $\alpha_{i+2}$. Voltage generator U, producing the reference voltage, is connected to the $\alpha_i$ input. The balancing resistances $R/K_1$, $R/K_2$, $R/K_3$, and $R/K_4$, connected to a common output junction E, are connected by their other terminals to respective outputs of circuits, $AND_1$, 2, 3 and 4. The existence of a voltage at the input means that there is a digit of rank *i*, while the other two inputs receive voltages representative of digits of higher rank or their complement, according to the maxterm considered. For this reason, the voltage V (or function of decodage) obtained at the output of the decoder is given by $$V=\sum_{i=0}^{i=n} P_i\alpha_i \qquad (3)$$

If a complete decoder is considered, in its general form, the binary cipher $\alpha$ of the least weight comprises in its respective circuit, $2^{N11}$ AND circuits having N inputs and $2^{N11}$ balancing resistances; the circuit for the second digit comprises $2^{N12}$ AND circuits having N−1 inputs and $2^{N12}$ balancing resistances, etc. Where N is the number of binary digits of the code, the complete circuit for decoding N digits therefore contains $2^n$ resistances.

If it is desired to operate the decoding function V by $2^{nN}$ given points, the $2^N$ resistances, representing the $2^N$ coefficients K of the general formula (1) above, are easily determined. It involves the solution of a system of $2^N$ equations of $2^N$ unknowns.

It will be noted that in the most common applications the balancing resistances can be functions that are simpler than those defined above for the general case. This is true, for example, when the $2^N$ points are not arbitrarily given, but are located on a given curve, for example, and more particularly when these $2^N$ points are located on a curve defined by a polynomial of the *nth* degree:

$Y=a_0+a_1x+a_2x^2......+a_nx^n$ (4).

Values for *x*are then given by successive whole numbers:

$x=\alpha_n2^n\alpha_{n11}a2^{n11}+.....+\alpha_12^1+\alpha_02^\circ$ (5).

This value for *x* is substituted into the *y* polynomial and, using identification according to the customary mathematical procedures, the balancing factors $P_i$ for each of the digits $\alpha_n$ are obtained. The numerical coefficients arising in the $P_i$'s are determined by the coefficients $a_o$ to $a_n$.

For example, if the given curve is a parabola defined by the equation $y=a_1x+_2x^2$ the balancing factors are reduced, for each digit, to a linear form of binary digits of higher rank.

Of the $2^{N11}$ maxterms, there are, in this instance, only *i* terms preserved, such that:

$$\begin{aligned}Y=\alpha_0[a_12^0+a_2(2^0+\alpha_12^2+\alpha_22^3\ \ldots\ \alpha_n2^{n+1})]\\ +\alpha_1[a_12^1+a_2(2^2+\alpha_22^4\ \ldots\ \alpha_n2^{n+2})]\\ +\alpha_{i-1}[a_12^{i+1}+a_2(2^{2(i-1)}+\ \ldots\ \alpha_n2^{n+1})]\end{aligned} \qquad (6)$$

where each term within brackets represents the balancing factor $P_i$.

Figure 4:
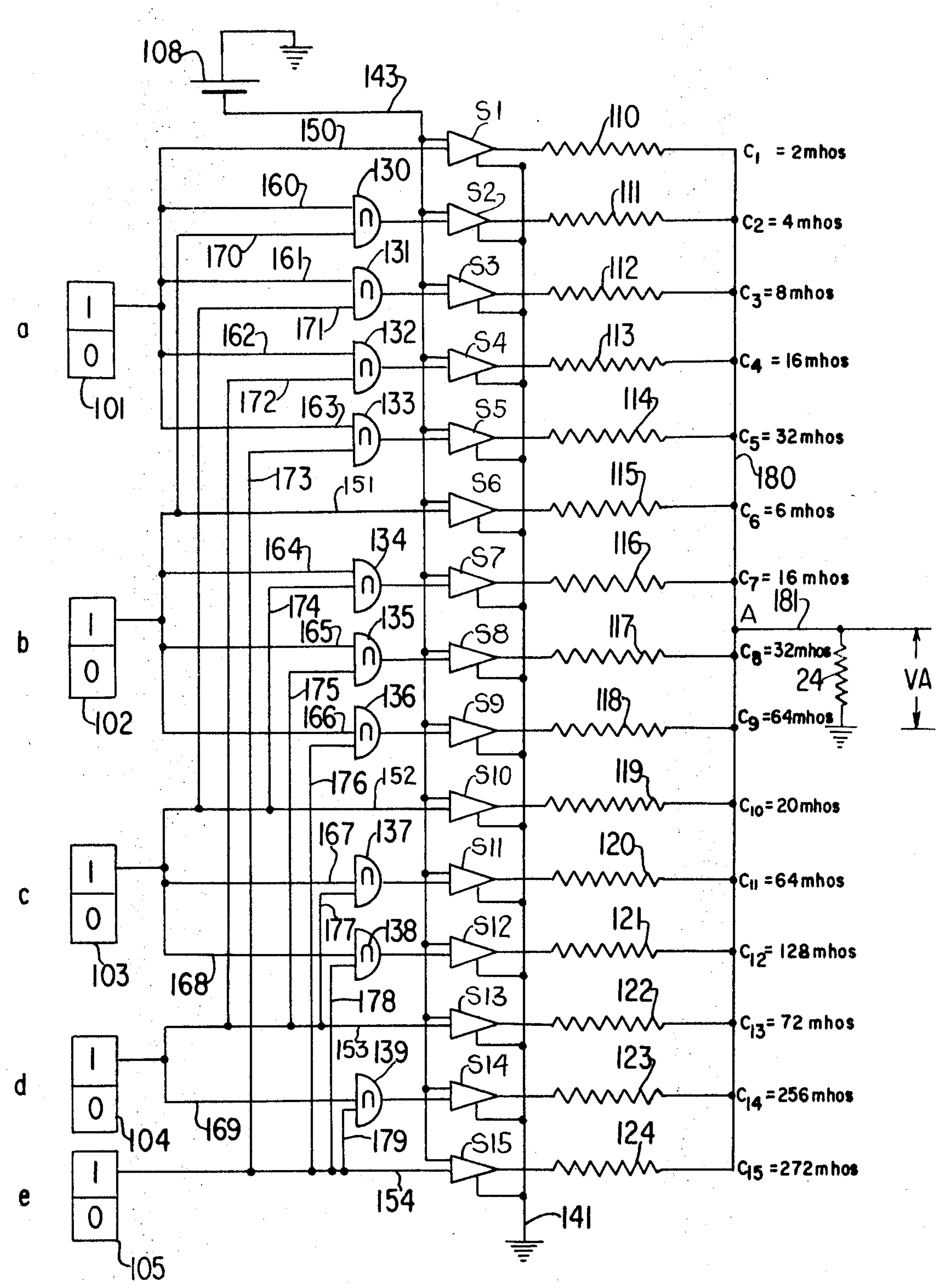
FIG. 4 illustrates in greater detail the digital-analogue aspect of the invention.

Referring now to FIG. 4, there is shown a five-digit converter for decoding and encoding the digits *a*, *b*, *c*, *d*, *e;* "*a*" being a digit of the lowest rank and "*e*" a digit of the highest rank. Bistable or flip-flop switches 101—105 sequentially operated in binary format by a suitable switching means, such as a comparator as hereinafter described, selectively connect a voltage source 108 to a network of resistances 110—124 through a plurality of logic AND elements 130—139 and switch elements S1—S15. The switches S1—S15 normally connect each of the resistances 110—124 to ground through a lead 141 but are operated by the logic AND elements and the binary digital switches 101—105 to connect the resistances to the voltage source 108 through lead 143.

Resistances 110, 115, 119, 122 and 124 and switches S1, S6, S10, S13 and S15 are directly connected by leads 150, 151, 152, 153 and 154 to their respective binary switches 101-—105. The remaining resistors 111, 112, 113 and 114 for digit "*a*", 116, 117 and 118 for digit "*b*", 120 and 121 for digit "*c*", and 123 for digit "*d*" are connected through the switch elements S2—S5, S7—S9, S11 and S12, and S14, respectively, to the logic AND elements 130—133, 134—136, 137 and 138, and 139, respectively. Each of the AND elements 130—139 are directly connected by leads 160—169 to one of its associated switches 101—105, and are connected by leads 170-—179 to each of the higher ranking switches 102—105. Logic element 130, for example, is connected by lead 170 to switch 102, logic element 131 is connected by lead 171 to switch 103, logic element 132 is connected by lead 172 to switch 104, and so forth down the line for each of the AND elements. For each binary switch except the highest ranking switch 105 (rank *e*), therefore, there is a directly coupled resistor and one resistor for each digit of higher rank. Switch 105, of course, has only the direct coupled resistor 124 since there are no binary or digital switches of higher rank.

The downstream or output side of the resistors 110—124 is connected to a buss 180 having an outlet terminal 181 which provides an analogue voltage at point A dependent upon the connection of the resistors 110—124 with ground or the lead 143 and reference voltage 108 in accordance with the operation of the digital switches 101—105 and the logic elements 130—139. Terminal 181 is connected to a resistor 24 of low ohmic value (20—40 ohms, for example) which may be connected either to ground (FIG. 4) to provide an analogue voltage $V_A$ for any desired use such as in a computer or for analogue computations, or to a comparator circuit as shown in FIG. 2.

Figure 6:
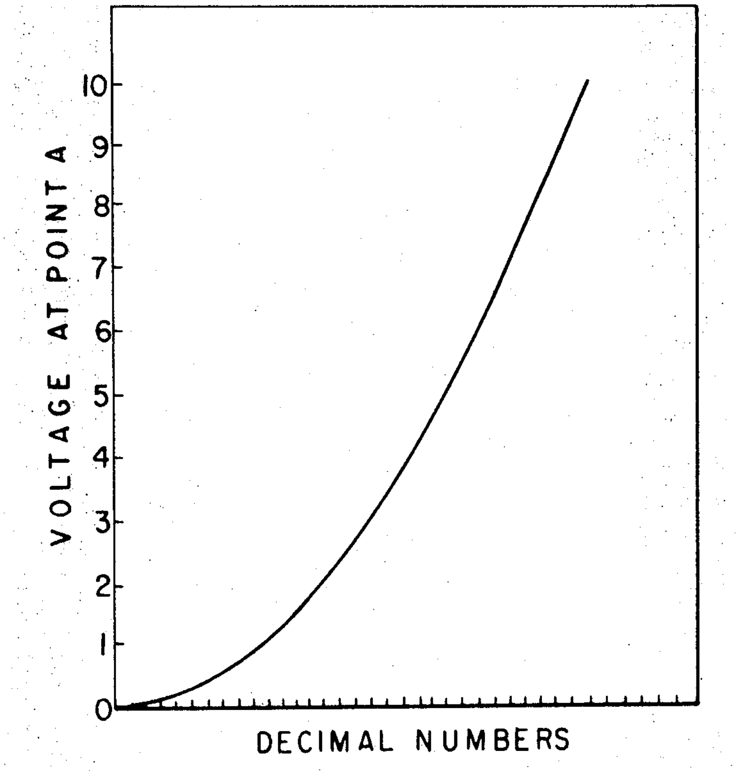
FIG. 6 is a curve of the output of the converter shown in FIG. 4 as set forth in the table of FIG. 5.

The table or chart, FIG. 5, and curve, FIG. 6, show the analogue voltages produced at outlet terminal A using the mhos listed on FIG. 4 for the resistances 110—124 and a reference voltage 108 of 9.92 volts. For simplicity in the following equations, the value of the resistances is expressed in terms of conductance (mhos) the reciprocal of resistance (l/R). The operation of the converter can readily be traced by reference to the equivalent circuits shown in FIGS. 7 and 8. When the digit 00001 is applied, for example, the equivalent circuit is shown in FIG. 7. Since only binary digital switch "*a*" is operated to "1", only the switch Sl is operated, and only conductance C1 (resistance 110) is connected to the reference voltage 108. The voltage $V_A$at point A, accordingly, is expressed by the following formula:

$$V_A=V_{Ref}\cdot\frac{C_1}{C_1+C_2+C_3+\ \ldots\ C_{15}}=9.92\frac{2}{992}=0.2 \text{ volt}$$

Figure 8:
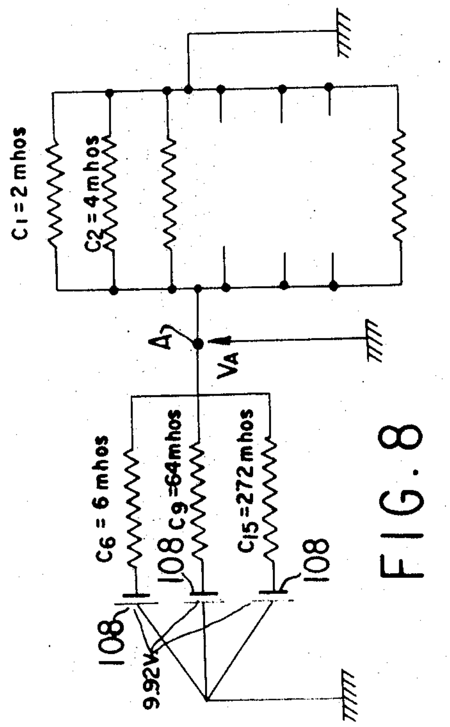
FIG. 8 is a like equivalent diagram demonstrating the application of another digital number.

For the digit 10010, digital switches "*e*" and "*b*" will be operated. Switches S6 and S15 connect the conductances C6 and C15 (resistances 115 and 124) to the reference voltage 108. Switch S9 connects conductance C9 (resistance 118) to the reference voltage via logic element 136 and leads 166 and 176. Conductances C6, C9 and C15 are now each connected to the reference voltage 108 as shown in FIG. 8 and the formula for this circuit if as follows:

$$V_A=V_{Ref}\cdot\frac{C_6+C_9+C_{15}}{C_1+C_2+C_3+C_4\ \ldots\ C_{15}}=9.92\frac{6+64+272}{992}=3.42 \text{ volts}$$

Figure 3:
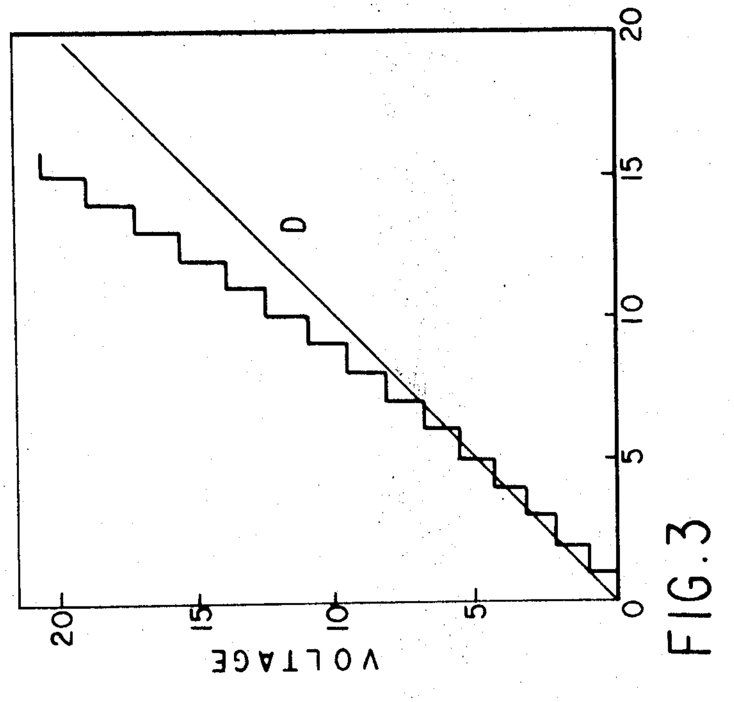
FIG. 3 illustrates the respective characteristic voltages of linear and nonlinear converters.

In like manner, the voltage at point or terminal "A" can be calculated for each digital number of the binary code applied, and the result is a nonlinear output as illustrated in FIGS. 3 and 6, the particular outputs being shown for voltages following a parabolic curve of the type shown in FIG. 6.

It will be evident from the foregoing, however, that the converter of the invention is not limited to a digital-analogue converter but may be utilized for digital-analogue-digital converter. Referring to FIG. 2, there is shown a four-digit converter having a source of input 1 for providing an operative or reference voltage for each of the binary digital switches 2—5 ($d_0$—$_3$) adapted sequentially to be operated by a comparator means 6 connected to the output voltage 23 of the converter. The binary digital switches 2—5 are connected to logic elements 7—12 so as to provide one input connection to a digital switch of a given rank and another input connection to digital switches of higher rank, as described in connection with FIG. 4. In this embodiment, the switches S1—S15 of FIG. 4 are omitted since the reference voltage may be applied directly through the switches 2—5 and logic elements 7—12. Preferably, however, a switching means such as switches S1—S15 of FIG. 4 would be provided for each of the switches 2—5 and logic elements 7—12. The purpose of the S-type switches is to provide a reference voltage input for the network resistances of precisely controlled magnitude, in the order of 1/1000 of a volt, for example, since the logic element signal after having traversed a number of connections, gates and other circuit elements becomes modified and does not present the desired precision.

Referring more particularly to FIG. 2, there is a voltage source 1 producing a reference voltage, and electrical or electromechanical digital switching means 2, 3, 4, and 5 of known design, which can be controlled through currents produced in a comparator device 6. There are provided three AND circuits 7, 8 and 9, each having two inputs. One input of each of these circuits is connected to the output of switch 2, representing digit $d_0$. The second input of 7 is connected to switch 3, representing $d_1$. The second input of circuit 8 is connected to switch 4, representing $d_2$. The second input of circuit 9 is connected to switch 5, representing $d_3$. Thus, with this hookup, circuits 7, 8 and 9 connect the value of $d_0$ to the three terms of higher rank. Two AND circuits 10 and 11, each having two inputs, have one of their inputs connected to switch 5. AND circuit 12 has one of its two inputs connected to switch 3, representing $d_1$. The other input of 10 is connected to switch 4, and the other input of 11 is connected to switch 5. AND circuit 12 has one of its two inputs connected to switch 4 and the other to switch 5.

Of the weighing resistances 13 to 22, resistances 13, 14, 15, 17, 18 and 20 are connected to the respective outputs of AND circuits 7 to 12, and resistances 16, 19, 21 and 22 to the outputs of switches 2, 3, 4 and 5, respectively.

Resistances 13 to 22 have a common junction or outlet terminal (node) 23, to which is connected a resistance 24 that is connected, at its other end, to a source 25, the electromotive force $U_A$ of which it is desired to express numerically. Finally, comparator 6, which successively closes switches 2, 3, 4 and 5 is also connected to node 23.

The operation of such a converter is based on the comparison of successively opposing voltages fed to the junction or terminal of the network of resistances 13—22 and the source 25 to be measured. One always begins with the digit of the largest weight, that is, with switch 5($d_3$). If the difference shown by the comparator 6 is positive, switch 4($d_2$) is closed. If negative, switch 5 is opened before switch 4 is closed in the usual manner of operating binary digital switches from a comparator. In comparison with a linear converter, the nonlinear voltages of FIG. 2 are illustrated in FIG. 3 wherein a linear voltage is designated by line D and the nonlinear voltages by the stepped lines.

Figure 9:
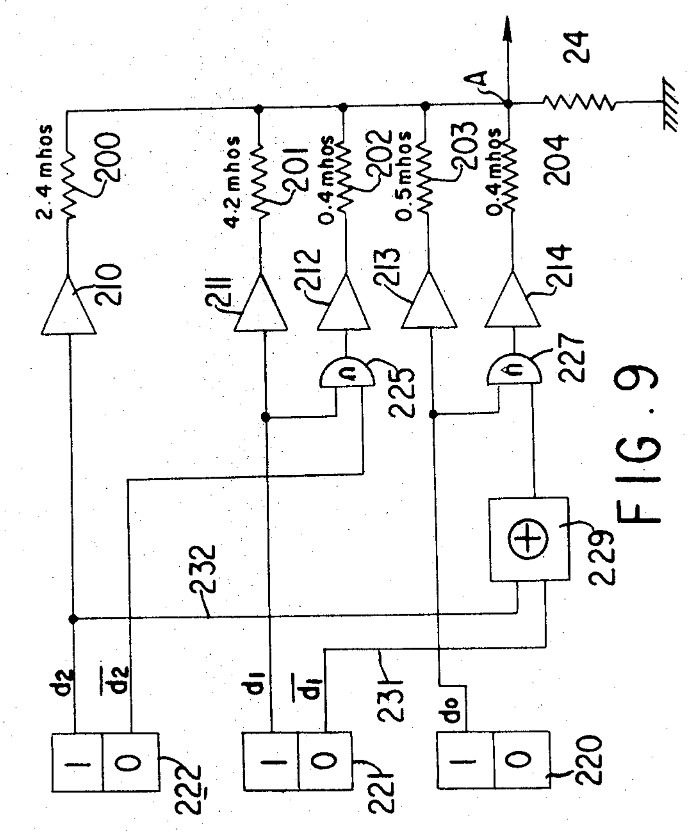
FIG. 9 is a representation of a three-digit converter utilizing the complements of digits of higher rank to provide a desired nonlinear output.
Figure 10:
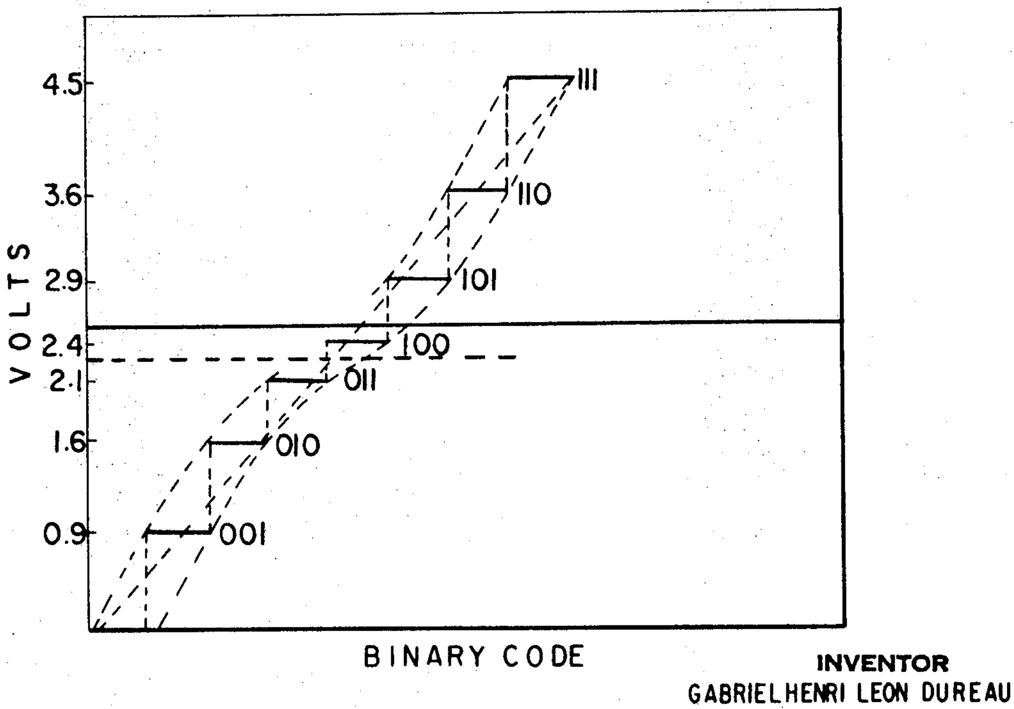
FIG. 10 is a curve of the voltage outputs of the converter of FIG. 9.

In FIG. 9 of the drawings, there is illustrated a converter utilizing the complements of digits of a higher rank to produce output voltages having the curvature of a parabola of inversely curved branches as shown in FIG. 10. Referring to FIG. 9, there are shown resistances 200—204 connected through switches 210—214 to binary digital switches 220—222 and logic AND switch elements 225 and 227. The logic switch element 227 is connected through an adder logic (excl.or) circuit 229 and connectors 231 and 232 to the complement $\bar{d}_1$ of digit $d_1$ and to $d_2$. In this circuit the network resistances may have a conductance value of the designated mhos and the reference voltage source (not shown) is 4.9 volts. Values of the analogue voltage at point A are shown on the chart of FIG. 10.

In many practical examples, the indication of pickups or sensors, such as thermocouples and output pickups, appears as a voltage at the output of the pickup or sensor; and the relation between the physical value and the voltage is generally not linear. Consequently, as already seen, the circuit of the invention changes this relationship to a linear one.

Another application of the nonlinear digital-analogue converter of the invention is the generation of functions. To this end, comparator 6 and source 25, of FIG. 2, are removed. Resistance 24, which has a small value (around 20, 30 or 40 ohms, for example), is grounded or earthed. If switches 5, 4, 3 and 2, representing the binary digits $d_3$, $d_2$, $d_1$ and $d_0$ in accordance with the increasing binary numeration 0000—0001 0010—0011....(where the O's represent open switches and the 1's represent closed switches) are closed, there is produced at node 23, of the resistances, a voltage that increases in accordance with the steps of FIG. 3, that is, as a parabola, and not linearly, as straight line D. The possibilities offered can be seen immediately, as, for example, in analogue calculations where a function can be generated with the accuracy and stability of numerical analogue converter systems.

Another advantageous use of the nonlinear digital-analogue converter of the invention is its application in the aforesaid pulse-code modulation telecommunciation systems, known as PCM. It is long known that these systems have aroused interest for their ability to define small amplitude instantaneous signals by means of quantizing steps of equally small amplitude, and increasing the value of the steps with the amplitude of the signal. Up to the present, the signal was usually instantaneously compressed by a semiconductor device and then fed to a linear converter. By substituting the nonlinear converter of the invention there is caused a direct coding of the signal with the help of steps that increase with the instantaneous amplitude of the signal. This has a very important economic advantage, because the quantizing noise met with in these systems is thereby reduced in a manner that is certain and with an apparatus that is unique.

I claim:

1. In a converter of the digital-analogue type for producing analogue voltages having a nonlinear characteristic, the combination of means including a plurality of at least four digital switches for providing successive signals in progressive binary coded format, a plurality of logic AND element means associated with each of said digital switches except that of highest rank, the number of logic AND elements associated with each switch of given rank being equal to the number of digital switches of a higher rank, each of said logic AND elements having two input terminals, means for connecting each of said digital switches except that of highest rank to an input terminal of each of its associated logic AND elements, means for connecting the other input terminals of the respective logic AND elements associated with each digital switch of a lower rank to a different digital switch of a higher rank, a resistance network comprising a plurality of weighted resistances connected at their output ends to a common output terminal, there being one resistance associated with each digital switch and a separate resistance associated with each logic AND element, a source of reference voltage, means including a switch means directly connected between the input ends of each of said first named resistances and its associated digital switch for normally connecting said inputs to ground and selectively connecting the inputs to said reference voltage in response to a signal from the digital switch, and means including a switch means directly connected between the input ends of each of said second named resistances and the output of its associated logic AND elements for normally connecting said inputs to ground and selectively connecting the inputs to said reference voltage in response to an output signal from the logic AND element.

2. In a converter as set forth in claim 1, in which said means including a plurality of digital switches of at least four for providing successive signals in progressive binary coded format, said first-mentioned means including a switch means, comprises means for selectively connecting said first-named resistances to said reference voltage in direct response to a signal from the associated digital switches, and in which said second-mentioned means including a switch means comprises means for selectively connecting said second-named resistances to said reference voltage solely in response to an output signal from their associated logic AND elements.

3. A converter as set froth in claim 2 in which a separate switch means connected to the input side of each of said resistances of said resistance network and operable in response to an output signal from the respective digital switches and logic AND elements associated with said resistances provides for selectively connecting the resistances to ground or to said reference voltage.

4. A converter as set forth in claim 2 in which said common output terminal is connected to a low value resistance having its other end connected to ground thereby to provide a series of analogue voltages at said terminal having a predetermined nonlinear characteristic.

5. A converter as set forth in claim 2 in which means is provided for connecting said common output terminal to a voltage to be measured and to a comparator means, and means operated by said comparator means provides for gating said digital switches.

6. A converter as set forth in claim 2 in which there is provided for each digital switch a number of associated logic AND elements corresponding to the number of higher ranking digits, each digital switch is directly connected to one of the inputs of its associated logic AND elements, and each digital switch of higher rank is directly connected to the other input of a logic AND element associated with each digital switch of lower rank.

7. A converter as set forth in claim 2 in which an input of at least one of said logic AND elements is connected to a complement of a digit of higher rank, and an input of another of said logic AND elements is connected through a logic "ADDER" means to said digit of higher rank and the complement of another digit of higher rank.

UNITED STATES PATENT OFFICE

CERTIFICATE OF CORRECTION

Patent No. 3,576,561 Dated April 27, 1971

Inventor(s) Gabriel Henri Leon Dureau

It is certified that error appears in the above-identified patent and that said Letters Patent are hereby corrected as shown below:

In the heading, Column 1, line 8, "Alcate" should be --Alca Column 3, line 24, "$2^{N11}$" should be --$2^{N-1}$-- (two occurrenc Column 3, line 25, "$2^{N12}$" should be --$2^{N-2}$--; Column 3, lin "$2^{N12}$" should be --$2^{N-2}$--; Column 3, line 30, "$2^{nN}$" should be --$2^{N}$--; Column 3, line 45, "$x=a_n 2^n a_{n11} a2^{n11}+\ldots.$" should be --$x=a_n 2^n a_{n-1} a2^{n-1}+\ldots.$--; Column 3, line 56, "$2^{N11}$" shou be --$2^{N-1}$--; Column 4, line 66, "if" should be --is--; Colu lines 40 and 41, "to switch 5. AND circuit 12 has one of i two inputs connected" should be deleted.

Signed and sealed this 14th day of December 1971.

(SEAL)
Attest:

EDWARD M.FLETCHER,JR.
Attesting Officer

ROBERT GOTTSCHALK
Acting Commissioner of Patents